United States Patent
Patton et al.

(10) Patent No.: US 9,254,792 B2
(45) Date of Patent: Feb. 9, 2016

(54) EQUIPMENT STORAGE AND RETRIEVAL SYSTEM

(71) Applicants: Mark Patton, Hidden Springs, ID (US); Kurt Barats, Eagle, ID (US)

(72) Inventors: Mark Patton, Hidden Springs, ID (US); Kurt Barats, Eagle, ID (US)

(*) Notice: Subject to any disclaimer, the term of this patent is extended or adjusted under 35 U.S.C. 154(b) by 118 days.

(21) Appl. No.: 13/942,976

(22) Filed: Jul. 16, 2013

(65) Prior Publication Data
US 2014/0037410 A1    Feb. 6, 2014

Related U.S. Application Data

(60) Provisional application No. 61/679,716, filed on Aug. 4, 2012.

(51) Int. Cl.
| B60R 11/00 | (2006.01) |
| B60R 9/10  | (2006.01) |
| B60P 3/12  | (2006.01) |

(52) U.S. Cl.
CPC .............. *B60R 11/00* (2013.01); *B60P 3/122* (2013.01); *B60R 9/10* (2013.01)

(58) Field of Classification Search
CPC ........................................................ B60R 11/00
USPC ......... 224/400–403, 405, 282, 495–497, 502, 224/510, 310, 545, 554
See application file for complete search history.

(56) References Cited

U.S. PATENT DOCUMENTS

| 2,784,027 | A |   | 3/1957  | Temp |
| 4,305,695 | A |   | 12/1981 | Zachrich |
| 4,522,326 | A | * | 6/1985  | Tuohy, III ..................... 224/310 |
| 4,900,217 | A |   | 2/1990  | Nelson |
| 5,037,153 | A | * | 8/1991  | Stark ............................. 296/37.6 |
| 5,121,959 | A | * | 6/1992  | King ............................. 296/37.6 |
| 5,226,714 | A |   | 7/1993  | Wright |
| 5,533,771 | A |   | 7/1996  | Taylor et al. |
| 5,741,038 | A |   | 4/1998  | Fowler et al. |
| 5,884,824 | A | * | 3/1999  | Spring, Jr. ..................... 224/310 |
| 5,988,722 | A |   | 11/1999 | Parri |
| 6,065,799 | A |   | 5/2000  | Suwabe et al. |
| 6,099,232 | A | * | 8/2000  | Dixon et al. .................. 414/494 |
| 6,120,075 | A |   | 9/2000  | Terry |
| 6,308,873 | B1 |  | 10/2001 | Baldas et al. |
| 6,382,480 | B1 | * | 5/2002 | Egly et al. .................. 224/42.33 |
| 6,658,700 | B2 |  | 12/2003 | Wortman |
| 7,159,917 | B2 | * | 1/2007 | Haaberg ..................... 296/26.09 |
| 7,175,060 | B1 |  | 2/2007  | Carpenter et al. |
| 7,277,273 | B2 |  | 10/2007 | Smith et al. |
| 7,338,104 | B1 | * | 3/2008 | Bejin et al. ................. 296/26.09 |
| 2002/0005648 | A1 |  | 1/2002 | Carpenter et al. |
| 2003/0146636 | A1 |  | 8/2003 | Keller |
| 2004/0084919 | A1 |  | 5/2004 | Weyhrich |
| 2006/0102669 | A1 | * | 5/2006 | Fouts et al. .................... 224/404 |
| 2010/0096872 | A1 |  | 4/2010 | Brogdon |

\* cited by examiner

*Primary Examiner* — Brian D Nash
(74) *Attorney, Agent, or Firm* — Robert L. Shaver; Shaver & Swanson, LLP

(57) ABSTRACT

An equipment storage and retrieval system retrieves equipment from the back of pick-up trucks and other cargo carrying vehicles. A guide rail and a frame with attached rollers and equipment hold-downs, platforms or carts allow for easy access, retrieval, and storage of equipment in the bed of a vehicle. A frame extends out the back of a pickup for access to equipment, and folds into a vertical position for improved use of the pickup bed. A brake system prevents locks the sliding frame in place until the brake is released by a brake lever.

18 Claims, 13 Drawing Sheets

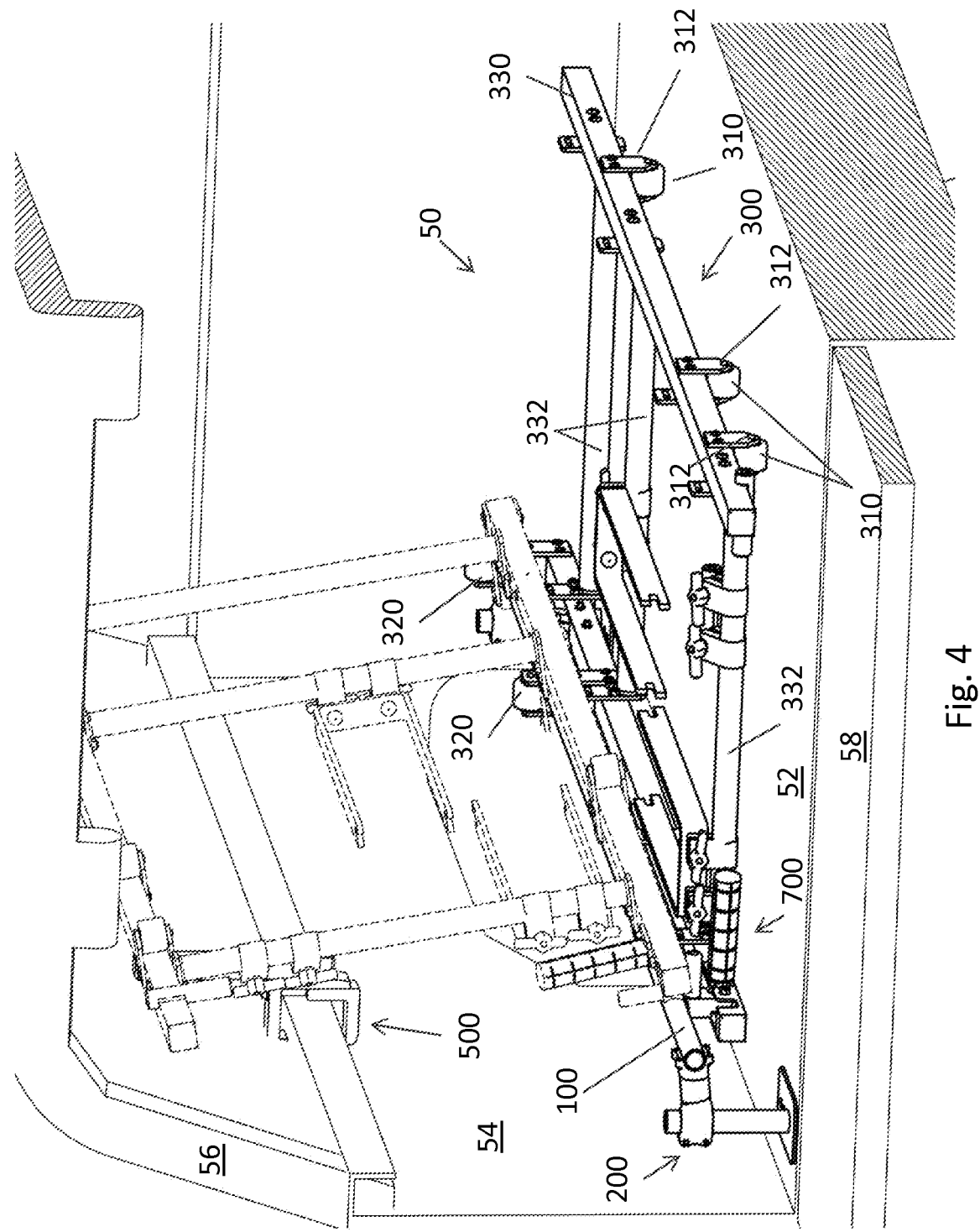

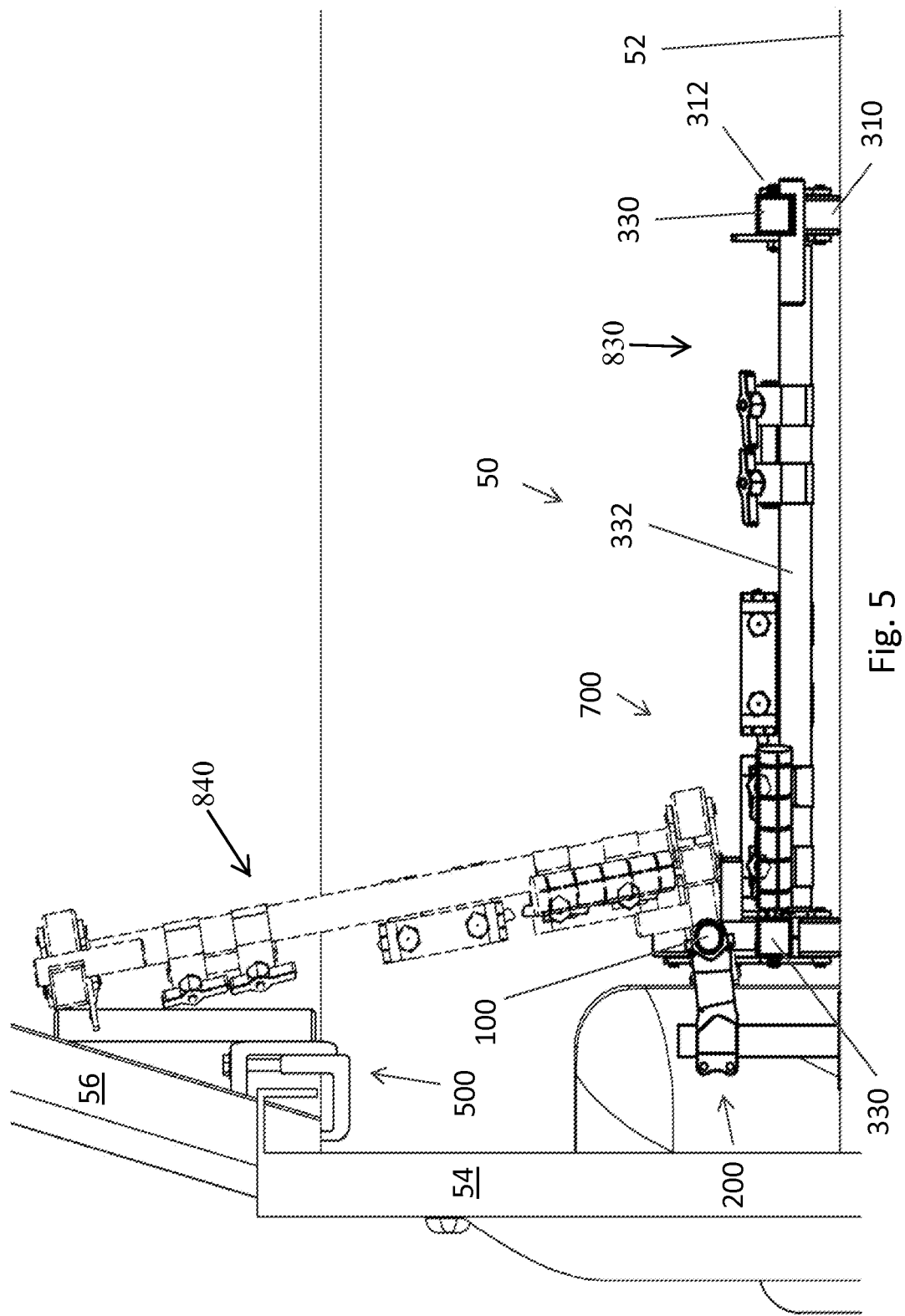

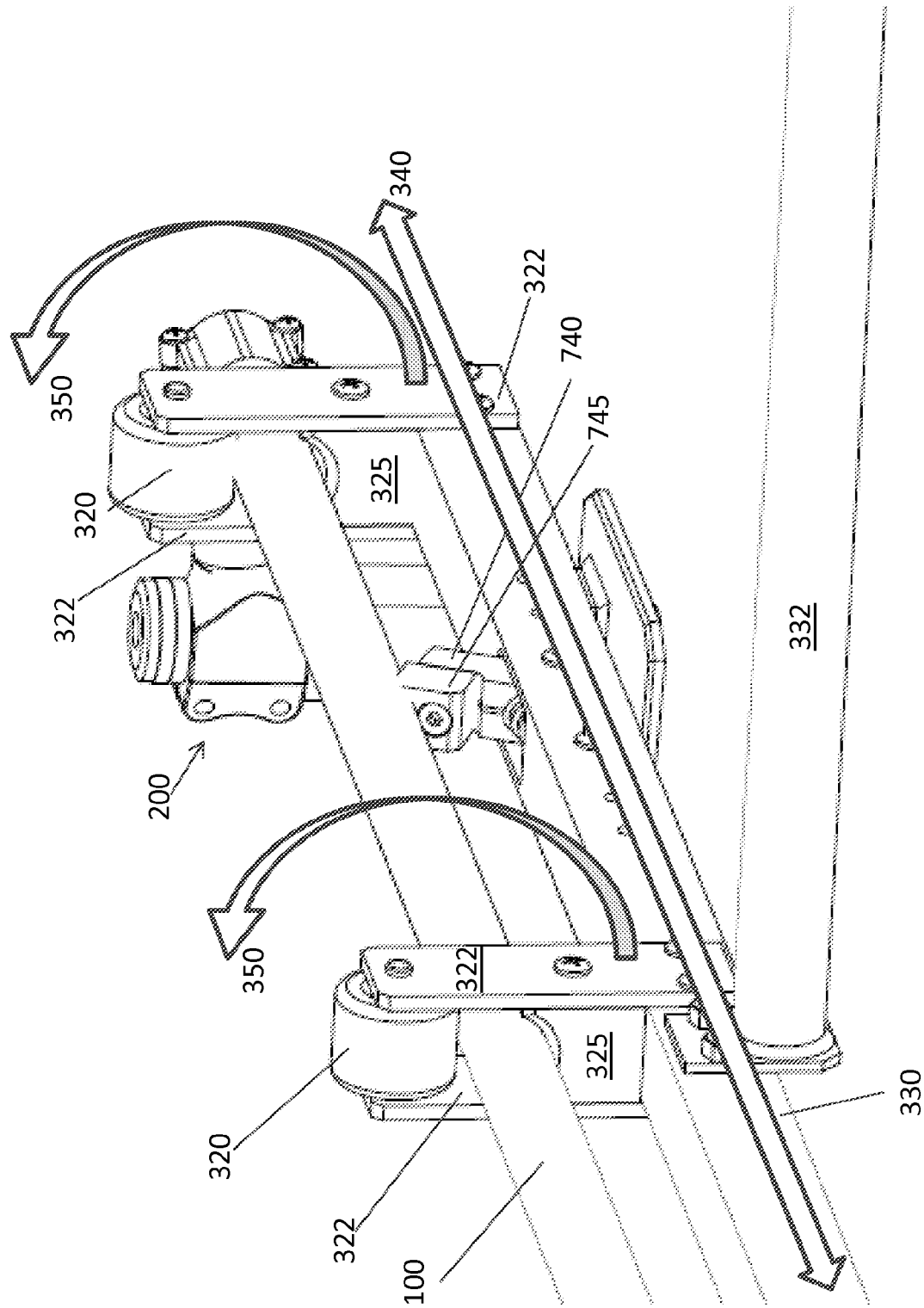

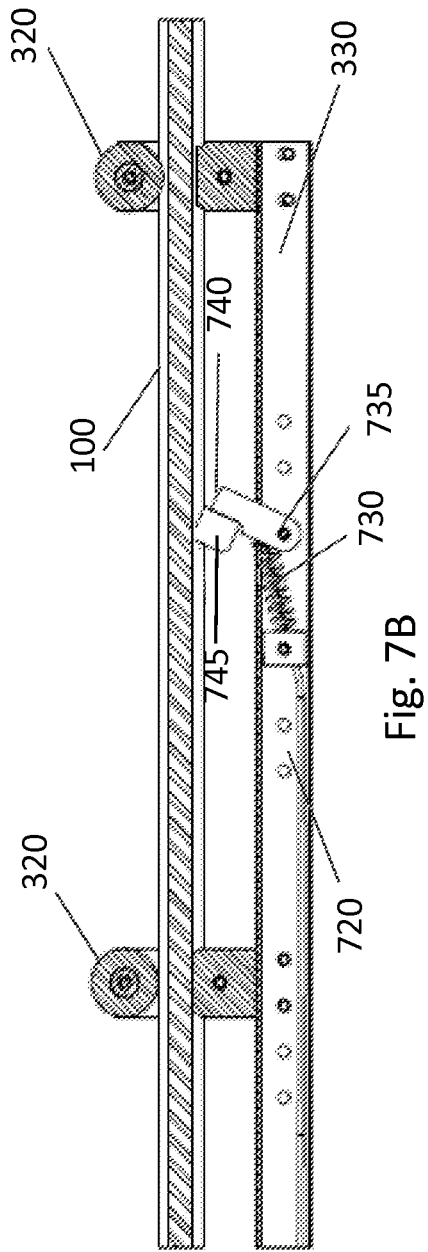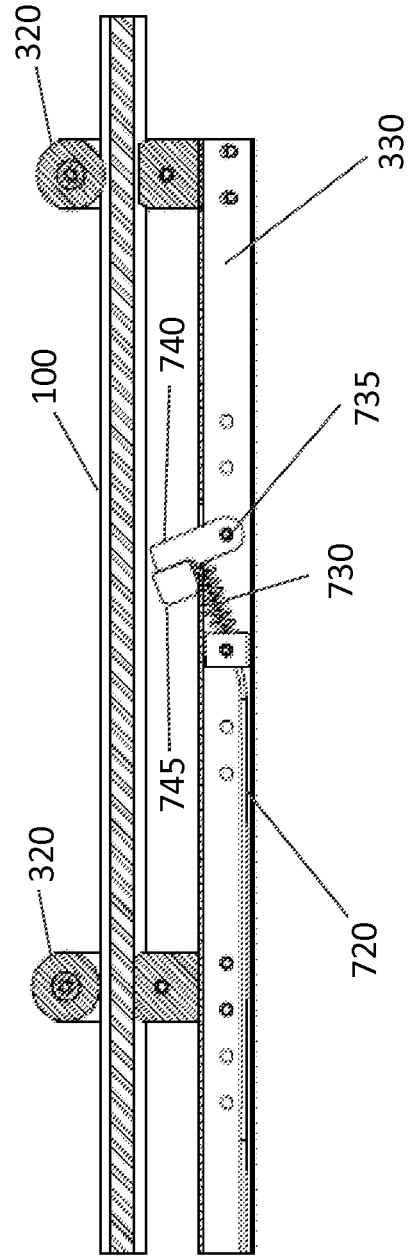

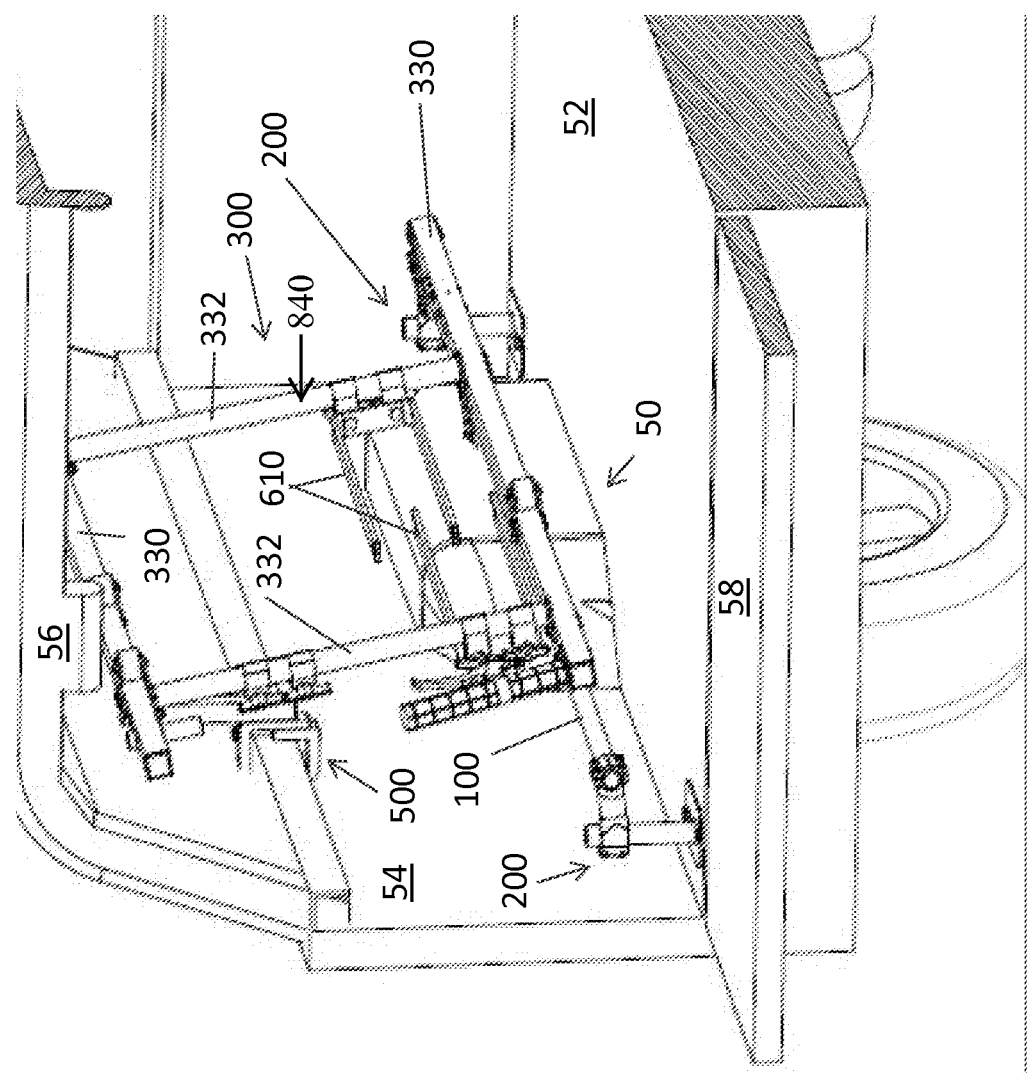

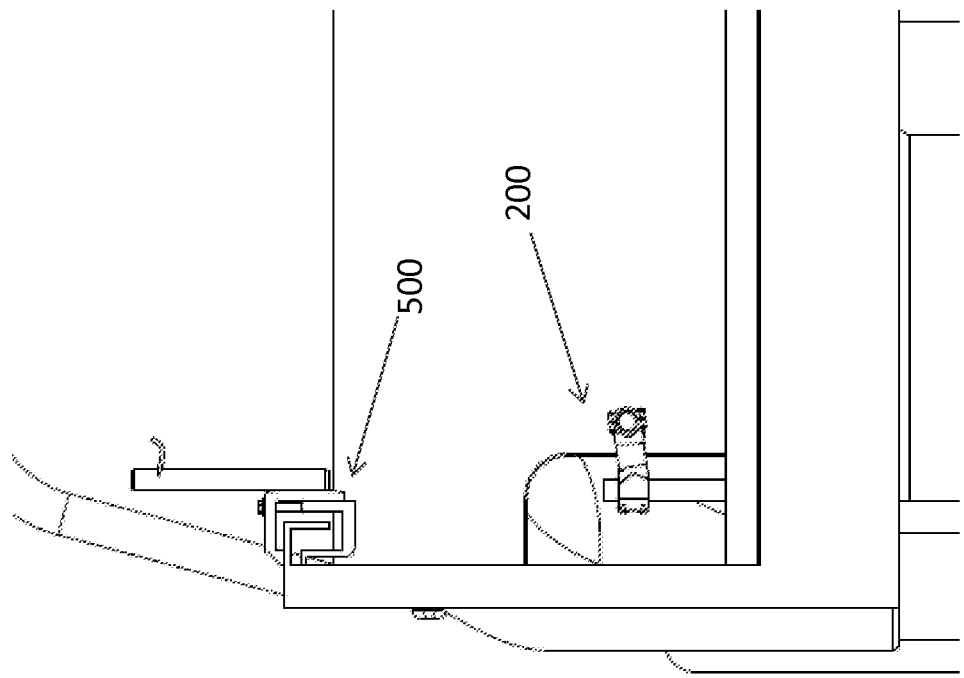

EQUIPMENT STORAGE AND RETRIEVAL SYSTEM

PRIORITY/CROSS-REFERENCE TO RELATED APPLICATIONS

This application claims the benefit of U.S. Provisional Application No. 61/679,716, filed Aug. 4, 2012, the disclosure of which is incorporated by reference.

TECHNICAL FIELD

The disclosed technology generally relates to the field of equipment storage and retrieval system for vehicles, and in particular storage and loading racks for pickup trucks, sport utility vehicles, trailers and vans.

BACKGROUND

Current slide-able truck bed extensions, truck bed extenders, and vehicle drawer systems are very heavy, are semi-permanent and are not easily removed for repurposing the vehicle. Further, for removal, many systems require first the removal of all the contents piecemeal or as one heavy load and then removal of mounting hardware. None of the prior art meet the requirements of being light weight and easy to install and remove. Most are designed to take up the full space of the cargo or pick-up bed with no other options. None are easy to disengage and move out of the way without fully removing the system.

SUMMARY OF THE DISCLOSURE

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the inventive concept(s) of the application, which is measured by the claims, nor is it intended to be limiting as to the scope of the inventive concept(s) in any way.

The present vehicle storage and retrieval invention is designed to provide a storage and retrieval system which overcomes the limitations of the previous inventions. The storage and retrieval system is designed to be light weight and very easy to install and remove with an emphasis on portability and customer install ability. It is modular in design with one embodiment taking up only one half of the cargo floor. More storage capability can be added as the user requires. In addition to sliding forward and backward in the truck bed, is can also rotate up and off the cargo floor if more floor space is required and the user does not want to remove the storage and retrieval system. The present vehicle storage and retrieval system also is adapted to receive cycle, ski, snow-board and other equipment hold-downs and clamps currently on the market.

In one embodiment the equipment storage and retrieval system mounts in the bed of pick-up trucks and other cargo carrying vehicles, and carries sporting equipment. The disclosed technology is particularly useful for owners of pick-ups with bed covered shells. The shell makes it difficult to retrieve items from the back of the truck without climbing into the pick-up bed. The technology includes a guide rail secured to the vehicle by use of an attachment mechanism secured to the vehicle. A frame slidingly and rotatably attaches to the guide rail and uses rollers to glide along the rail toward the tail gate or toward the cab of the vehicle. The frame also rotates between a first position, horizontal and parallel to the bed, and a second position, vertical and upright from the bed. This second position allows use of the vehicle bed with the frame rotated out of the way. A fold up latch secures the frame in the second stowed position. The frame is adapted to receive a number of bike, ski, kayak and other equipment hold-downs and clamps. These fixtures attach to the frame and enable the attachment of various types of sports equipment for transport.

A braking mechanism is attached to the frame, and frictionally grasps the guide rail, thereby impeding motion of the frame along the guide rail unless deliberately released by a user.

In addition to sporting equipment, carts, cargo platforms, and secure storage vaults, boxes, or bins also attach to the frame to hold other material such as tools or loose items. The vaults can be closed and locked to secure equipment even in an open pick-up bed. Outrigger bars can be added to the frame to support additional bikes, cargo or other equipment on the side of the frame.

Various combinations of platforms and carts are disclosed, providing a modular storage technology, enabling the user to adapt the system to specific cargo combinations. In addition, a unique mechanism allows the user to easily fold the frame up and out of the way when not in use. This gives the user complete access to the vehicle bed to carry lumber or other supplies when the storage and retrieval system is not required.

The disclosed system makes storing and retrieving equipment as easy as rolling a cart. A user may stand at the back of a vehicle and pull the rack out to retrieve such items as tools, bicycles, boxes, and sporting equipment. The disclosed retrieval system enables the user to pull the frame out toward the rear of the vehicle to access material secured to the frame. A braking lever acts to release the frame for motion on the guide rail while simultaneously acting as a handle to pull the frame toward the user. Once the desired item is retrieved, the user releases the brake and rolls the frame back into place in the vehicle bed. The brake acts as a locking mechanism to keep the frame in place during transit. An additional safety latch/strap is supplied, which, when engaged, ensures that the storage and retrieval system cannot move without the user's intervention.

The disclosed technology includes a brake which continuously applies friction along the guide rail and may lock onto the guide rail, thus locking the frame on the guide rail unless the brake handle is compressed. Another important feature is that the end of the frame can extend out past the end of a folded down tail gate. This makes gear and equipment faster and easier to load and unload. This capability is governed by the location of the guide bar wheel assembly which is closest to the tailgate and its relationship with the tailgate vertical mount. The frame is suspended from the guide rail by rail rollers and rail roller brackets. These are mounted in the forward portion of the frame, such as the front half or front third, to allow maximum extension of the rack. The rear end of the frame and the unsuspended side of the frame are supported by bed rollers. Another important feature is that the frame rotates off the vehicle bed. This is made possible by the way the guide bar and guide bar wheel assemblies were designed and interact. This capability facilitates full use of a user's truck bed even with the rack installed.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE DRAWINGS

The summary above and the following detailed description will be better understood in view of the enclosed figures which depict details of various embodiments. It should, however, be noted that the invention is not limited to the precise arrangement shown in the drawings and that the drawings are provided merely as examples.

FIG. 4 shows a perspective view of one embodiment of Equipment Storage and Retrieval System in a second position off of the vehicle bed.

FIG. 5 shows an end view of one embodiment of the Equipment Storage and Retrieval System in a second stowed position off of the vehicle bed.

FIG. 6 shows one embodiment of frame rotation and translation details.

FIGS. 7A through 7C show details of one embodiment of a brake mechanism.

FIG. 9 shows one embodiment of the frame in a rotated up position.

FIGS. 10A-10C show one embodiment of the mounting mechanism.

DETAILED DESCRIPTION OF THE EXEMPLARY EMBODIMENTS

Figure 1:
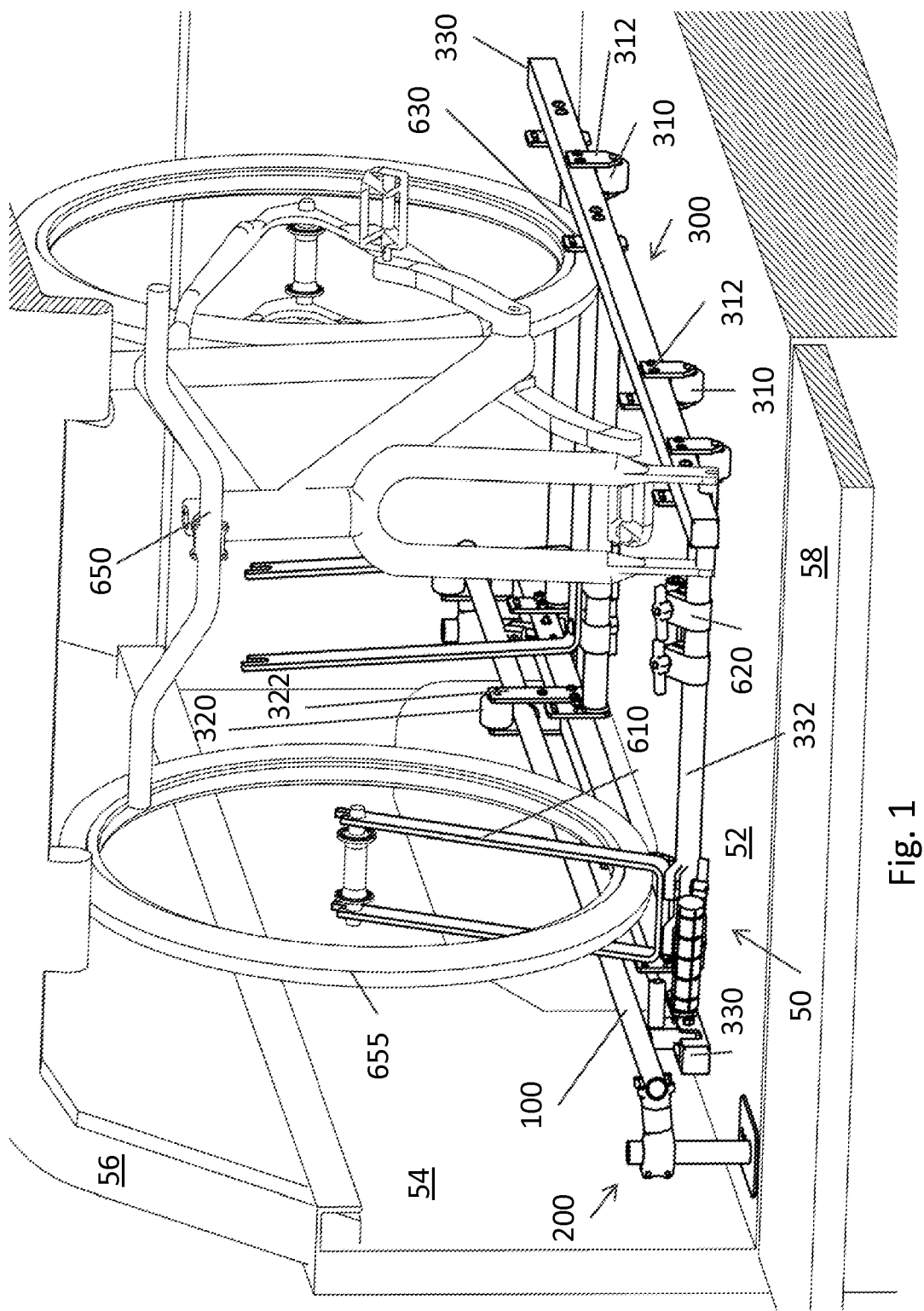
FIG. 1 shows a perspective view of one embodiment of Equipment Storage and Retrieval System holding cycling equipment.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

In FIG. 1 an embodiment of the Equipment Storage and Retrieval System 50 attaches to a vehicle such as a pickup with an attachment mechanism 200. In this embodiment the attachment mechanism 200 is depicted as a post or stem mounted to the vehicle bed 52. In other attachment mechanism embodiments, a clamping system attaches to the sidewalls of a pickup and braces against the pick-up bed without the need to drill holes or modify the vehicle. Other embodiments include pegs that fit into the existing holes or mounting points of vehicles. Still other embodiments can include drilling of the vehicle where necessary.

A guide rail 100 attaches to the attachment mechanism 200 in the front and back of the vehicle thus securing the guide rail 100 to the vehicle bed 52. A frame 300 is comprised of longitudinal frame members 330 and transverse frame members 332. The frame 300 attaches to the guide rail 100 by means of rail rollers 320 and rail roller brackets 322. As will be described in more detail in the following figures, the rail rollers 320 and rail roller brackets 322 allow the frame 300 to be rotated about the guide rail 100 or pulled out from the vehicle bed 52 to partially clear both the vehicle sidewall 54 and vehicle canopy 56. When the frame 300 is pulled out from the vehicle bed 52, the rail rollers 320 guide the frame 300 along the guide rail 100. The rack can be made adjustable in width, to even take up the entire width of a truck bed, by a version of transverse frame member 332 which telescopes out to a selected width. The telescoping transverse frame members 332 could be secured in place by holes in the telescoping tubes, secured by pins through corresponding holes in the tubes.

Although these components could be made of any suitable material, and dimensions can vary depending on the particular installation, suitable guide rails can be made using round steel tubing typically 1⅛" inches in diameter, with a preferred rack material being square steel tubing 1¼" in by 1¼" inches. Obviously, square tubing could be substituted with round tubing and would still be within the inventive concept of the disclosed technology.

Bed roller brackets 312 attached the bed rollers 310 to the frame 300. As the frame 300 is pulled outward from the vehicle bed 52, the bed rollers 310 partially support the weight of the frame 300 on the vehicle bed 52. The guide rail 100 and rail rollers 320 support the remaining weight not supported by the bed rollers 310. Some embodiments of the bed rollers 310 are unique in that they are wider than normal and have a flattened bottom which allows them to span the bed troughs that are formed in the vehicle bed 52 or by a bed liner. The bed rollers 310 are preferably soft with a hardness factor of approximately 95 Shore-A. This softness helps absorb sound and adds resistance to the frame 300 translation thus adding more control as the frame 300 is rolled in and out of the vehicle bed 52.

Various types of equipment hold-downs or clamps 610, 620 and 630 attach to the longitudinal frame members 330 or transverse frame members 332. These hold-downs are adapted to hold or clamp or restrain various types of sporting or other equipment. Collectively they are referred to as hold-downs. Hold downs exist and are commercially available for items such as skis, snow boards, bicycles, kayaks, and other sporting equipment. FIG. 1 shows the hold-downs 610, 620 and 630 securing a bicycle frame 650 and bicycle tire 655 to the frame 300.

Figure 2:
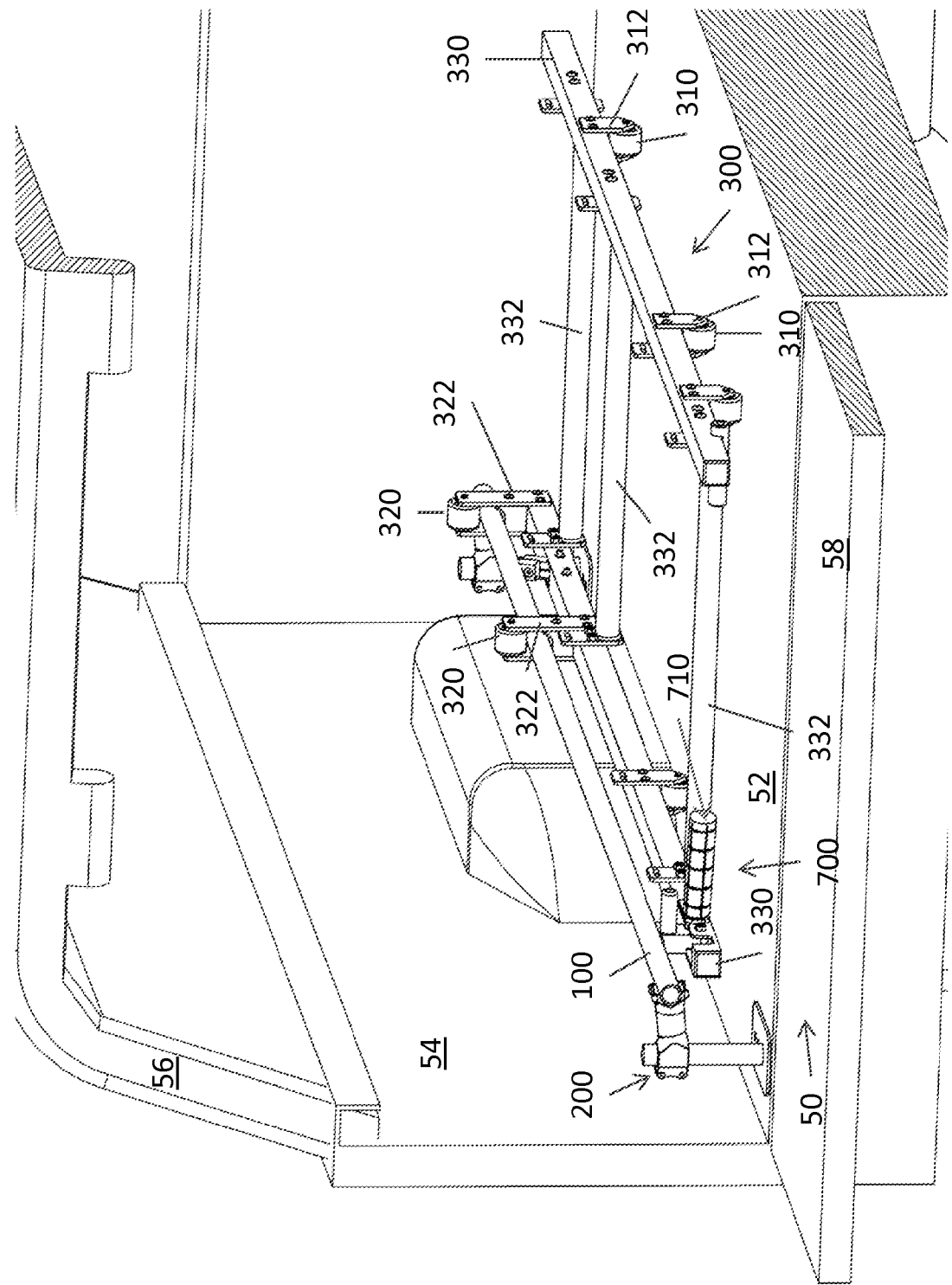
FIG. 2 shows a perspective view of one embodiment of the Equipment Storage and Retrieval System installed on a pick-up bed.

FIG. 2 shows the Equipment Storage and Retrieval System 50 without the bicycles of FIG. 1. An attachment mechanism 200 attaches a guide rail 100 to the vehicle bed 52 or vehicle sidewall 54. A frame 300 comprised of longitudinal frame members 330 and transverse frame members 332 glides along the guide rail 100 supported by rail rollers 320 and rail roller brackets 322 on one side and bed rollers 310 and bed roller brackets 312 on the other side.

A brake system 700 arrests the frame 300 on the guide rail 100 preventing movement of the frame 300 along the guide rail 100. When the brake lever 710 is activated by the user, the frame 100 is released and may move along the guide rail 100 on rail rollers 320 and along the vehicle bed 52 on bed rollers 310. The brake system 700 acts to prevent the motion of the frame 300 during transport when the vehicle is in motion.

Figure 3:
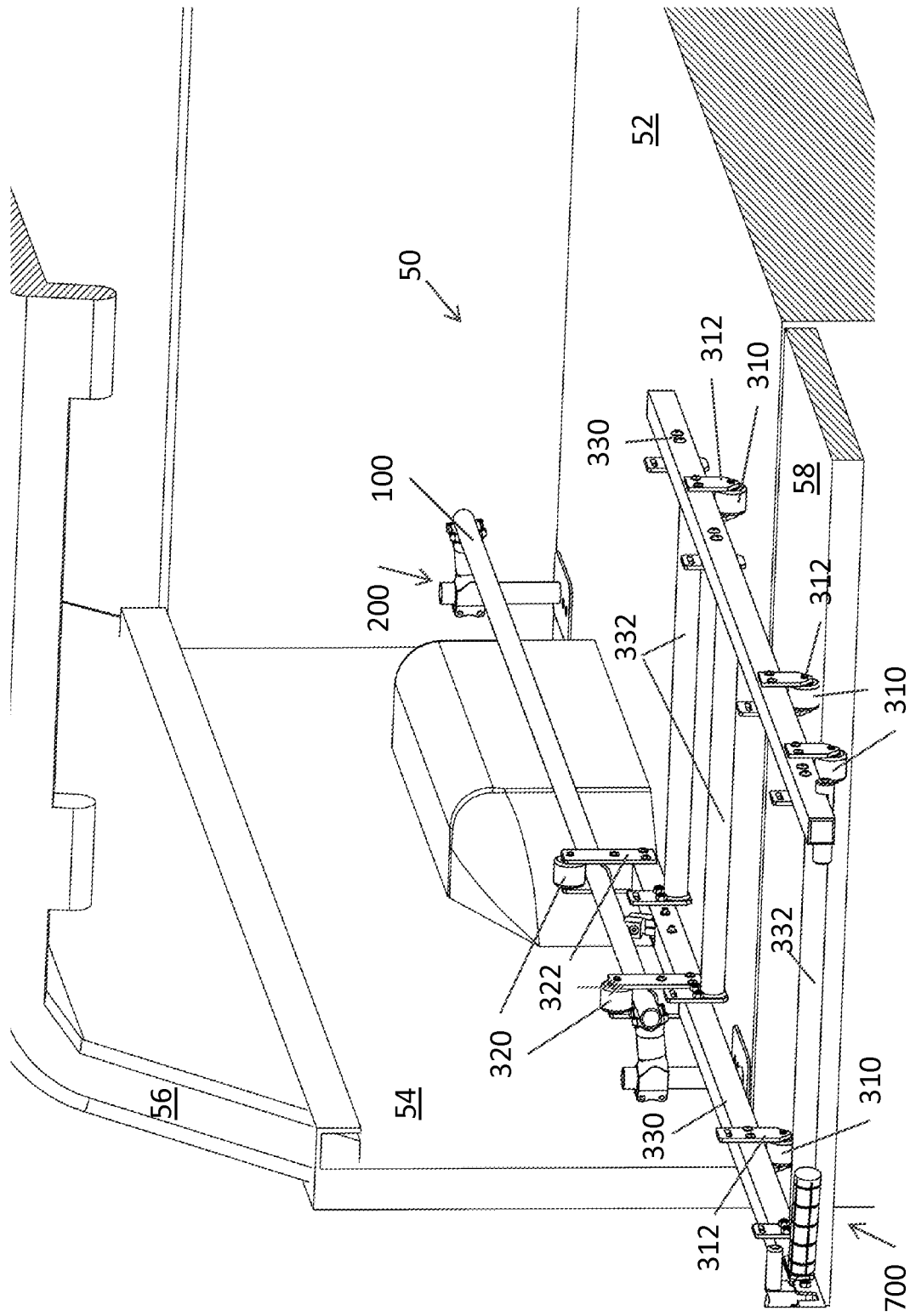
FIG. 3 shows a perspective view of one embodiment of Equipment Storage and Retrieval System extended out of the pick-up bed onto the vehicle tail gate.

FIG. 3 shows one embodiment of the Equipment Storage and Retrieval System 50 extended from the vehicle bed 52. Rail rollers 320 and rail roller brackets 322 guide the frame 300 along the guide rail 100 and partially support of the weight of the frame 300. Bed rollers 310 and bed roller brackets 312 support the remaining weight of the frame 300 on the vehicle bed 52 and vehicle tail gate 58. The bed rollers 310 are spaced along the frame 300 such that they support the frame 300 as it travels from the vehicle bed 52 onto the vehicle tail gate 58. The bed rollers 310 are located in such a manner as to minimize the impact on the frame 300 as weight is loaded onto the frame 300 and the frame 300 is rolled over the gap that is created by the tailgate 58 and vehicle bed 52 separations. Some bed rollers 310 may actually roll off of the vehicle tail gate 58 with the remaining bed rollers 310 supporting the frame 300 on the vehicle bed 52 and vehicle tail gate 58. This additional extension capability of the frame 300 from the vehicle bed 52 enables easy access to equipment attached to the frame 300. This extension capability is especially useful in vehicles with sidewalls 54 or vehicle canopies 56.

FIG. 4 shows a perspective view of the Equipment Storage and Retrieval System 50 in a second, folded up position in dotted lines. The frame 300 rotates about the guide rail 100 and off of the vehicle bed 52. A fold up latch 500 secures the frame in the second position. This second, folded up position allows the user to access the vehicle bed 52 for hauling other cargo when the Equipment Storage and Retrieval System 50 is not in use. In this manner, the vehicle bed 52 is available for use without the removal of the Equipment Storage and Retrieval System 50. However, if the full use of the vehicle bed is needed, the Equipment Storage and Retrieval System 50 can be removed by removing the brackets from the attachment device 200.

FIG. 5 is an end view of the Equipment Storage and Retrieval System 50 in a second, folded up position. The dotted outline of the equipment storage and retrieval system shows this second, folded up position 840. The first position 830 is shown, with the rack co-planar with the vehicle bed.

In operation, the user rotates the Equipment Storage and Retrieval System 50 from the folded up position of FIGS. 4 and 5 onto the vehicle bed as shown in FIG. 2. The frame 300 rotates about the guide rail 100 and onto the vehicle bed 52. The user releases the brake system 700 and pulls the frame 300 outwardly from the vehicle bed 52. The brake system 700 is a "dead man brake" in that the brake is always applied unless actively released by the user, by incorporation of a spring in the brake handle and lever. The extended Equipment Storage and Retrieval System 50 is shown in FIG. 3. If not already on the frame 300, the user attaches various types of hold downs 610, 620, and 630 onto the longitudinal frame members 330 or transverse frame members 332. The user then secures the sporting equipment, vaults tools or tool boxes onto the hold downs. FIG. 1 depicts a bicycle frame 650 and bicycle tire 655. Once the equipment is attached to the frame 300, the user releases the brake system 700 by squeezing the brake lever 710 of FIG. 7A, and pushes the equipment storage and retrieval system 50 off of the vehicle tail gate 58 and into the vehicle bed 52. Once released by the user, the brake system 700 holds the frame 300 to the guide rail 100 preventing further movement of the Equipment Storage and Retrieval System 50.

Once at the destination, the user lowers the vehicle tail gate 58, and releases the brake system 700 using the brake lever 710 pulling the Equipment Storage and Retrieval System 50 onto the tail gate 58. A major part of the equipment has now cleared the vehicle sidewall 54 and canopy 56 allowing the user easy access to the equipment. The user releases the hold downs 610, 620 and 630 to access the bicycle parts as shown in FIG. 1.

When the vehicle bed 52 is needed to haul other cargo such as lumber, the Equipment Storage and Retrieval System 50 can be stowed in a second folded up position as shown in FIGS. 4 and 5. The user removes the sporting or other equipment from the frame 300 and rotates the frame 300 off of the vehicle bed 52. The Fold up latch 500 holds the frame in this second folded up position and off of the vehicle bed 52.

FIG. 6 shows details of one embodiment of the frame 300. The longitudinal frame member 330 attaches to transverse frame members 332 of which one is shown. The longitudinal frame member 330 hangs from guide rail 100 by rail rollers 320 and rail roller brackets 322. As the frame 300 of FIG. 4 is moved along the vehicle bed 52, the longitudinal frame member 330 moves with the frame 300. The rail rollers 320, rail roller brackets 322, and the rail rotation blocks 325 constrain the longitudinal frame member 330 and therefore the frame 300 itself to move in a direction parallel to the guide rail 100. This movement parallel to the guide rail 100 is indicated by translation arrows 340. Bed rollers 310 and rail rollers 320 support the weight of the frame 300 as the frame 300 is moved inwardly and outwardly along the vehicle bed in the direction of translation arrows 340.

Rail rollers 320, rail roller brackets 322 and rail rotation blocks 325 enable the frame 300 to rotate about the guide rail 100 as indicated by the rotation arrows 350. The Rail rollers 320, rail roller brackets 322 and rail rotation blocks 325 constrain the frame 300 to either translate parallel to the guide rail 100 or rotate about the guide rail 100. When the frame 300 is rotated off of the vehicle bed 52 as shown in dashed line in FIG. 5, the vehicle bed is available for other cargo and the frame 300 is stowed in a second position out of the way.

Figure 7A:
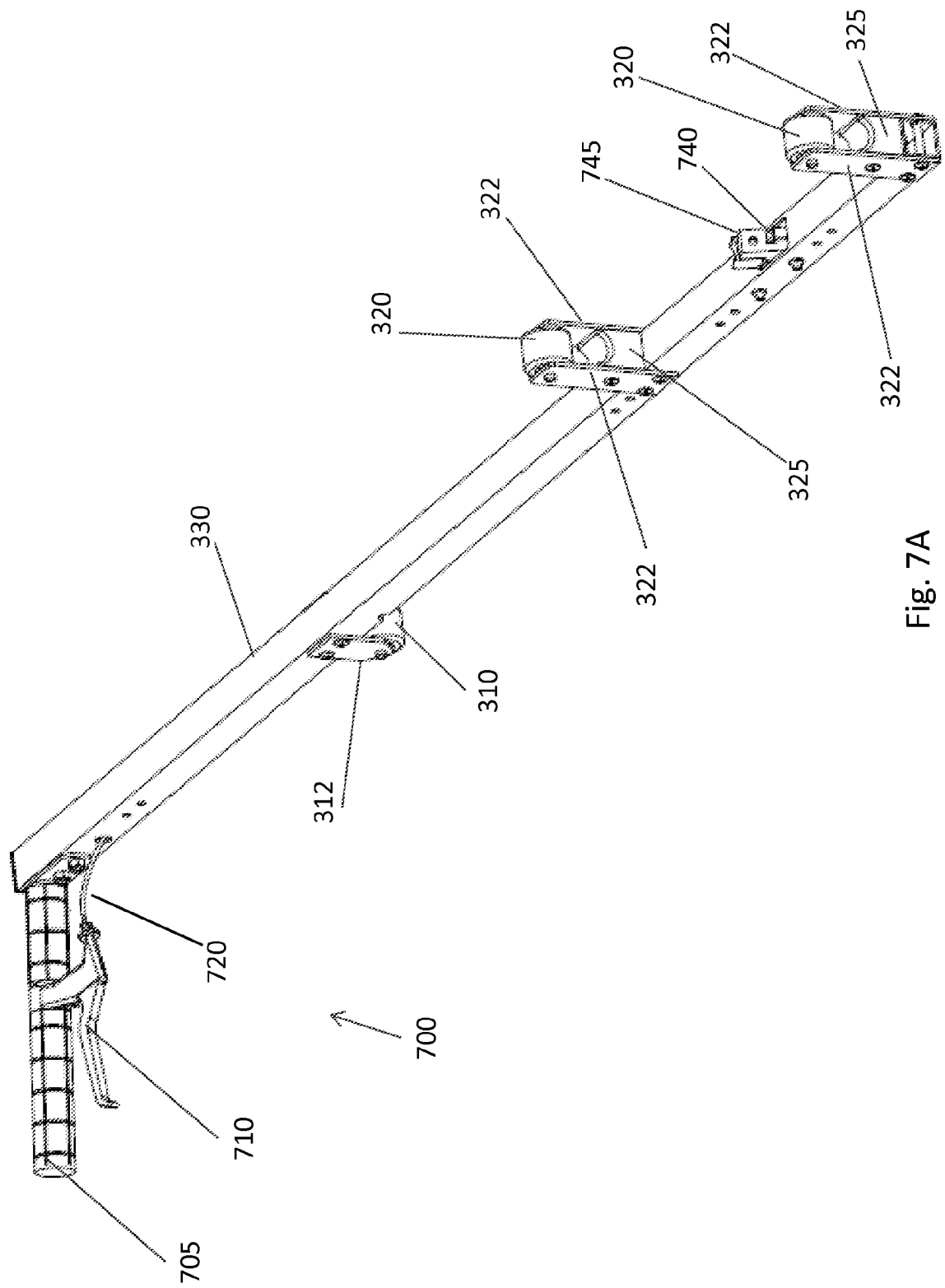

FIGS. 7A through 7C show one embodiment of the brake system 700. FIG. 7A shows one longitudinal frame member 330. This longitudinal frame member 330 rides on the guide rail 100 via rail rollers 320 which are supported by rail roller brackets 322. Bed rollers 310, of FIGS. 1-5, supported by bed roller brackets 312 support some of the weight of the rack on the vehicle bed 52. The guide rail 100 of FIG. 6 passes through the space defined by the rail rollers 320, rail roller brackets 322 and the rail rotation blocks 325. A brake shoe 745 attached to a brake pawl 740 is adapted to frictionally engage the guide rail 100 in a camming movement, and constrain the translational movement described in conjunction with FIG. 6. A brake lever 710 attaches to a brake handle 705 and brake cable 720.

FIG. 7B shows a side view of an embodiment where the brake shoe 745 frictionally engages the guide rail 100 to impede motion of the longitudinal frame member 330 and therefore the frame 300 relative to the guide rail 100. The brake pawl 740 rotates about a brake pivot 735. The brake spring 730 urges the brake pawl 740 and therefore the brake shoe 745 toward the guide rail 100. The embodiment shown is FIG. 7B further exhibits a cam action where the brake shoe 745 is forced harder into the guide rail 100 when the frame 700 experiences motion in one direction. The brake shoe 745 can impede motion of the frame 300 at any point along the guide rail 100. The brake spring 730 pushes on the brake pawl 740 rotating it about the brake pivot 735 and forcing the brake shoe 745 into contact with the guide rail 100. Since the brake system is always engaged unless specifically actuated by a user, it is sometimes referred to as a dead man brake. In some contexts the term pawl implies a member that engages specific areas of a gear or cog, in this context there is no such restriction. The brake pawl 740 allows braking at any point along the guide rail 100. This particular form of brake system is illustrative of one preferred braking system, and other braking systems could also be used, such as a locking brake lever, bicycle type caliper brakes, a wind nut, detents and holes in a tube, and other conventional braking systems.

FIG. 7C shows the embodiment of FIG. 7B when the brake lever 710 of FIG. 7A is actuated by a user. When the user actuates the brake lever 710 of FIG. 7A, the brake cable 720 pulls the brake pawl 740 and therefore the brake shoe 745 away from the guide rail 100. This actuation rotates the brake pawl 740 about the brake pivot 735 pulling the brake shoe 745 out of engagement with the guide rail 100. Once the brake shoe 745 is out of engagement with the guide rail 100, the frame 300 can move freely when pushed or pulled by the user.

Figure 8:
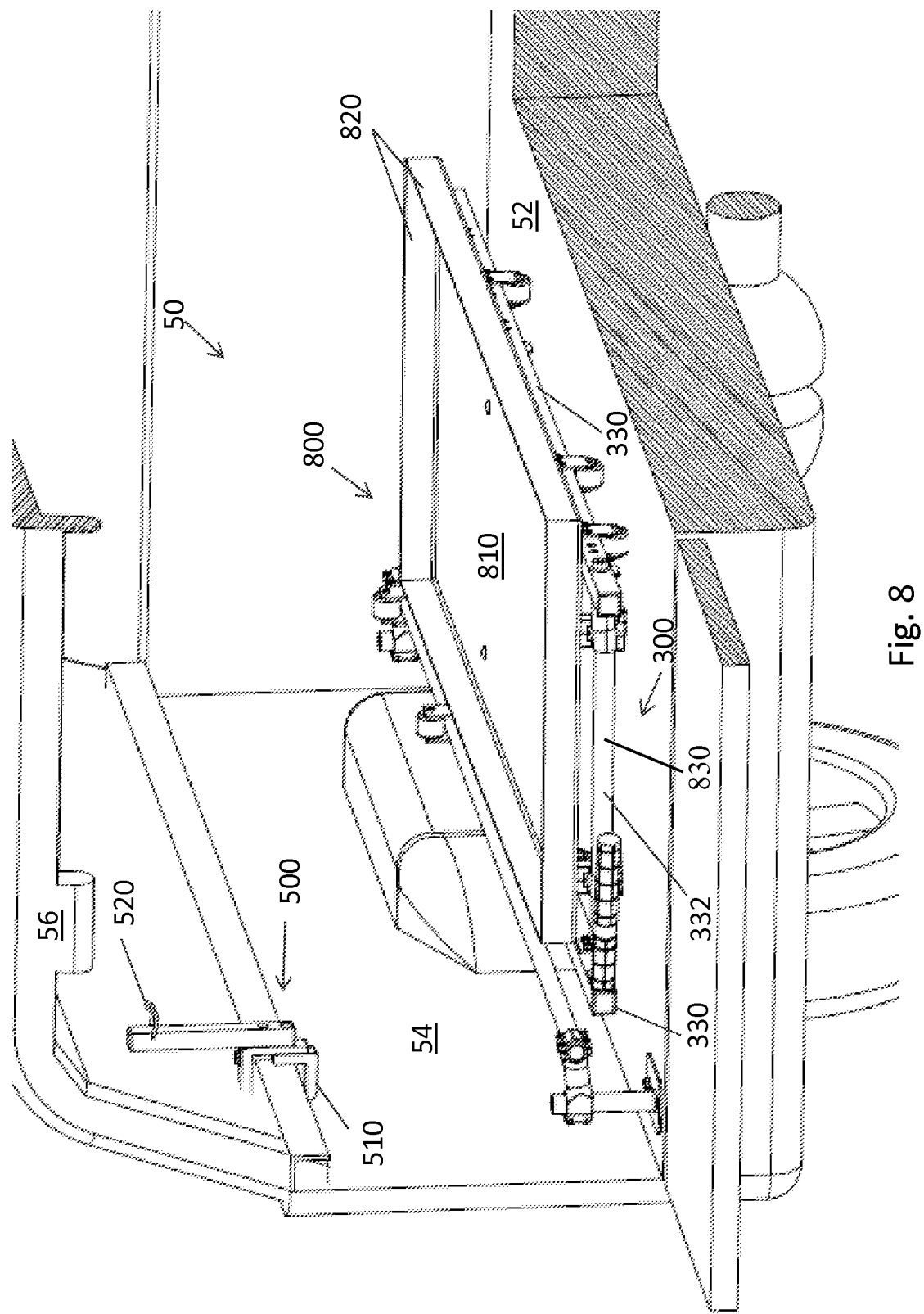
FIG. 8 shows a view of a frame embodiment with a cart top assembly and fold-up latch.

FIG. 8 shows another view of a preferred embodiment of the Equipment Storage and Retrieval System, in which a cart or tray 800 is mounted on the frame 300. The cart 800 has a cart platform 810 and cart side walls 820 of which two are indicated. The cart 800 is for constraining boxes, loose items or other cargo that is not readily adapted to the hold downs 610, 620 and 630 described in conjunction with FIG. 1. Other embodiments of the cart 800 can also have higher cart side walls 820 and a closeable locking lid, net cover, or other type of cover. While not shown, various embodiments of the cart 800 can take the form of one or more locking tool boxes. Such tool boxes are readily accessible from the rear of the vehicle when the frame 300 and therefore the attached tool box or cart 800 is extended out from the vehicle bed 52. Carts 800 in various embodiments can be secured to the frame members 332 and 330 from the inside making them theft resistant.

FIG. 8 also shows one embodiment of the fold-up latch 500. The fold-up latch 500 holds the frame 300 of the Equipment Storage and Retrieval System 50 in the folded-up or second position shown in FIGS. 4 and 5. The frame has a unique pivot and lock capability. When the frame is pivoted off the pick-up bed into the second position 840, it folds up into a shelf type support with retaining latch that secures the frame. It takes a disengagement action to unlock the frame and pivot it back to the pick-up bed in the first position 830. This provides for a secure method to stow the frame assembly off the pick-up, and thus provide clearance on the vehicle bed 52 for other uses. In this embodiment a fold-up latch mechanism 520 engages a portion of the frame 300 or cart 800 and maintains the frame 300 in the second or upright position. A fold-up latch clamp 510 attaches the fold up latch 500 to the vehicle sidewall 54 and/or vehicle canopy 56. In many embodiments the fold-up latch clamp allows attachment of the fold-up latch 500 to the vehicle without the need to drill holes or otherwise modify the vehicle. While the fold-up latch mechanism 520 is depicted as a hook/shelf in FIG. 8, other embodiments, not shown, can include hasps, locks, hook and pile (Velcro), straps, bungee cords, a shelf, carabineers, clamps, press-to-fit latches and other mechanisms.

FIG. 9 shows the Equipment Storage and Retrieval System 50 in the second position 840. FIG. 9 is similar to FIGS. 4 and 5 but with solid lines for the sake of clarity. Note that when in the upright or second position 840, the majority of the vehicle bed 52 is available for other cargo.

In some embodiments two equipment storage and retrieval systems 50 are installed in a vehicle, one on the right and one on the left. In such situations, each equipment storage and retrieval system 50 can be independently moved outward from the vehicle bed 52 onto the vehicle tail gate 58 for access to cargo. Each equipment storage and retrieval system 50 can also be independently rotated from the first position 830 on the vehicle bed 52 to the upright second position 840 off of the vehicle bed. Thus four combinations of folded-up/down are possible, increasing the flexibility of the vehicle.

Figure 10A:
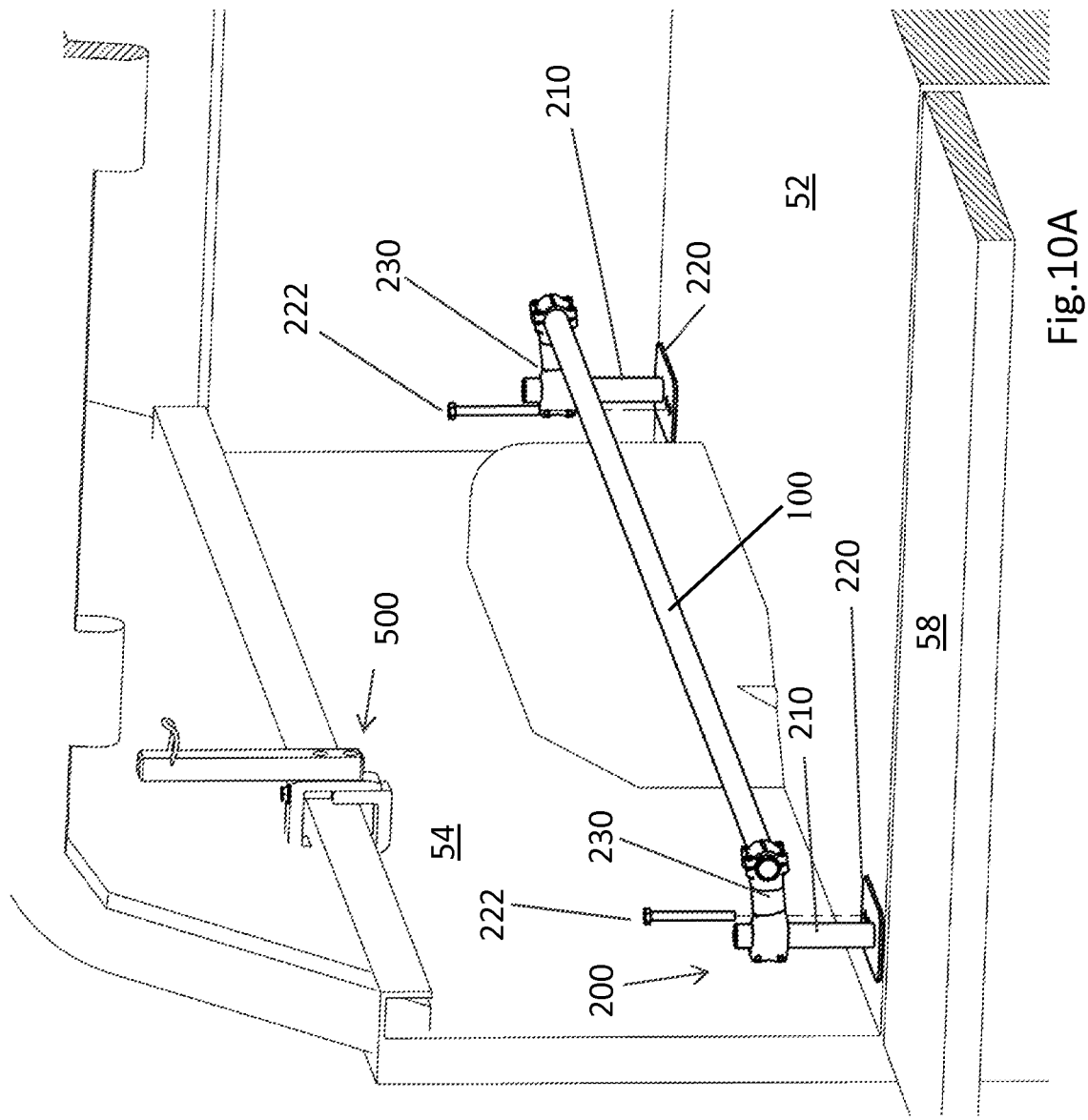
Figure 10C:
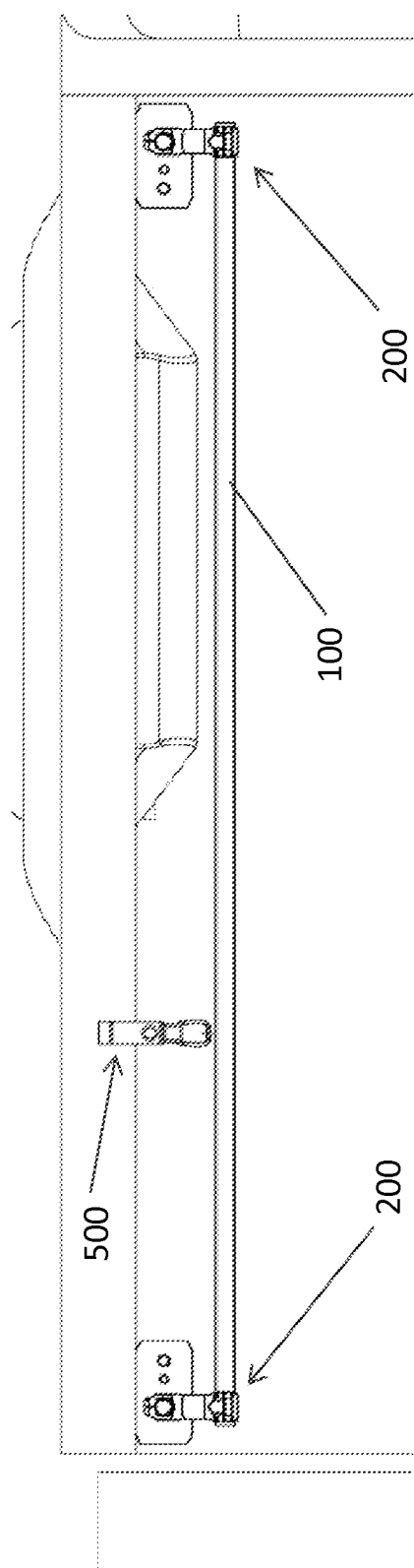

FIGS. 10A-10C show one embodiment of the attachment mechanism 200. The attachment mechanism 200 attaches the guide rail 100 to the vehicle bed 52 or vehicle sidewall 54. In FIG. 10A two posts 210 are secured to the vehicle bed 52 by post mountings 220 and post mounting fasteners 222. Two post to rail adapters 230 attach the guide rail 100 to the posts 210. In some embodiments the post to rail adapters 230 are of adjustable length to allow the guide rail 100 to clear the wheel well of the vehicle. FIG. 10B shows an end view of the attachment mechanism 200, while FIG. 10C shows a plan view of the attachment mechanism 200. While the attachment mechanism of FIGS. 10A-10C show the use of fasteners into the vehicle bed 52 or vehicle sidewall 54, no-drill versions are also possible. For example, a friction fit between the vehicle bed 52 and the top of the vehicle sidewall 54 also is possible. Clamps or expandable members can rigidly secure the attachment mechanism 200 to the vehicle and therefore the guide rail 100.

A number of materials are suitable for the Equipment Storage and Retrieval System 50. Examples include aluminum, steel, galvanized steel and plastics of various kinds. Mixed material selections are also possible. For example, the frame, rail, bracket, retrieval and brake system might be of galvanized steel while the rollers are hard plastic. The advantages of various material choices are known to those skilled in the art. Tubings of the guide rail 100 or the frame 300 can be square, round, oval, or rectangular, as preferred for a particular model.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. An Equipment Storage and Retrieval System for a vehicle, said vehicle having a bed, said equipment storage and retrieval system comprising:
    a guide rail mounted to said vehicle bed and on one side of said vehicle bed, said guide rail aligned longitudinally from front to back of said vehicle bed;
    at least one attachment post adapted to secure said guide rail to said vehicle bed;
    a frame slidingly attached to said guide rail, and configured for longitudinal movement from front to back in said vehicle bed, said frame supported on one side by said guide rail, and on the other side by one or more bed rollers;
    a braking system attached to said frame, said braking system adapted to secure said frame in a selected position on said guide rail; wherein
said frame is rotatably attached to said guide rail, with said frame rotatable between a first horizontal position resting on said vehicle bed, and a second vertical position with said frame supported by said guide rail, with a latch adapted to hold said frame in said second position.

2. The Equipment Storage and Retrieval System of claim 1 wherein said frame is adapted to receive sporting equipment hold-down fixtures.

3. The Equipment Storage and Retrieval System of claim 1 in which said braking system further comprises a braking handle and braking lever adapted to simultaneously release said braking mechanism and pull said frame toward a user.

4. The Equipment Storage and Retrieval System of claim 1 which further comprises a pair of attachment posts mounted to said vehicle bed to which said guide rail is removably attached.

5. The Equipment Storage and Retrieval System of claim 1 wherein said frame accepts a cart that has a flat bottom surface and attached vertical walls to support and retain cargo.

6. The Equipment Storage and Retrieval system of claim 1 wherein said frame is further adapted to receive storage vaults, boxes, containers and carts.

7. The Equipment Storage and Retrieval System of claim 1 wherein said frame is further adapted to receive additional longitudinal and transverse frame members to hold additional equipment.

8. An Equipment Storage and Retrieval System for a vehicle, said vehicle having a bed, said equipment storage and retrieval system comprising:
   a guide rail mounted to said vehicle bed and on one side of said vehicle bed, said guide rail aligned longitudinally from front to back of said vehicle bed;
   at least one attachment post adapted to secure said guide rail to said vehicle bed;
   a frame slidingly attached to said guide rail, and configured for longitudinal movement from front to back in said vehicle bed, said frame supported on one side by said guide rail, and on the other side by one or more bed rollers; and
   a braking system attached to said frame, said braking system adapted to secure said frame in a selected position on said guide rail, said braking system comprising a braking handle and braking lever adapted to simultaneously release said braking mechanism and pull said frame toward a user, in which said braking system further comprises a brake which frictionally engages said guide rail until released by said braking handle and braking lever.

9. An Equipment Storage and Retrieval System for a vehicle, said vehicle having a bed, said equipment storage and retrieval system comprising:
   a guide rail mounted to said vehicle bed and on one side of said vehicle bed, said guide rail aligned longitudinally from front to back of said vehicle bed;
   at least one attachment post adapted to secure said guide rail to said vehicle bed;
   a frame slidingly attached to said guide rail, and configured for longitudinal movement from front to back in said vehicle bed, said frame supported on one side by said guide rail, and on the other side by one or more bed rollers;
   a braking system attached to said frame, said braking system adapted to secure said frame in a selected position on said guide rail; wherein
said frame is suspended from said guide rail by a first and second rail roller and a first and second rail roller bracket, with said rail rollers and said rail roller brackets attached to a forward half of said frame to maximize the extension of said frame over a tail gate.

10. The Equipment Storage and Retrieval System of claim 9 which further comprises one of more bed rollers and bed roller brackets attached to said frame for supporting said frame on said vehicle bed.

11. An Equipment Storage and Retrieval System for a vehicle, said vehicle having a bed, said equipment storage and retrieval system comprising:
   a guide rail mounted to said vehicle bed and on one side of said vehicle bed, said guide rail aligned longitudinally from front to back of said vehicle bed;
   at least one attachment post adapted to secure said guide rail to said vehicle bed;
   a frame slidingly attached to said guide rail, and configured for longitudinal movement from front to back in said vehicle bed, said frame supported on one side by said guide rail, and on the other side by one or more bed rollers;
   a braking system attached to said frame, said braking system adapted to secure said frame in a selected position on said guide rail;
   in which said frame is capable of extending on said guide rail past the end of a tail gate, and capable of retracting into said bed to a point that said tail gate is closable.

12. The Equipment Storage and Retrieval System of claim 11 wherein said frame further comprises longitudinal and transverse frame members approximately orthogonal to each other.

13. An Equipment Storage and Retrieval System for a vehicle, said vehicle having a bed, said Equipment Storage and Retrieval System comprising:
   a guide rail mounted to said vehicle bed and on one side of said vehicle bed, said guide rail aligned longitudinally from front to back of said vehicle bed;
   at least one attachment post adapted to secure said guide rail to said vehicle bed;
   a frame slidingly attached to said guide rail, and configured for longitudinal movement from front to back in said vehicle bed, said frame supported on one side by said guide rail, and on the other side by one or more bed rollers; and
   a braking system attached to said frame, said braking system adapted to secure said frame in a selected position on said guide rail, said braking system comprising a braking handle and braking lever adapted to simultaneously release said braking mechanism and pull said frame toward a user, in which said braking system further comprises a brake which frictionally engages said guide rail until released by said braking handle and braking lever, wherein said braking mechanism further comprises a brake spring to continuously engage said baking mechanism unless a user specifically actuates a braking lever to release said braking mechanism, said braking mechanism further adapted to impede motion of said frame at any point along said rail, and said braking mechanism still further adapted to employ a cam action to increase said braking action.

14. An Equipment Storage and Retrieval System for a vehicle, said vehicle having a bed, said Equipment Storage and Retrieval System comprising:
   a guide rail mounted to said vehicle bed and on one side of said vehicle bed, said guide rail aligned longitudinally from front to back of said vehicle bed;
   a pair of attachment post adapted to secure said guide rail to said vehicle bed;
   a frame rotatably and slidingly attached to said guide rail, said frame rotatable to a first horizontal position resting on and parallel with said vehicle bed, said frame further rotatable to a second vertical position where said frame is off of said bed, with said frame adapted to receive sporting equipment hold-down fixtures;
   a plurality of rollers attached to said frame and configured to interfit with said guide rail, to provide sliding movement of said frame along said guide rail, with said rollers mounted on a forward half of said frame;
   a braking system attached to said frame, said braking system adapted to frictionally grasp said guide rail, impeding motion of said frame along said guide rail, with said braking system comprising a braking handle and braking lever with said braking lever configured to release frictional locking to said guide rail when said lever is activated;

a latch adapted to hold said frame in said second position; and a plurality of bed rollers attached to said frame for supporting said frame on said bed and to allow sliding movement of said frame forward and backward in said bed.

15. The Equipment Storage and Retrieval System of claim 14 wherein said braking mechanism further comprises a brake spring to continuously engage said baking mechanism unless a user specifically actuates a braking lever to release said braking mechanism; said braking mechanism further adapted to impede motion of said frame at any point along said guide rail, said braking mechanism still further adapted to employ a cam action to increase said braking action.

16. The Equipment Storage and Retrieval System of claim 14 wherein said frame further comprises longitudinal and transverse frame members approximately orthogonal to each other.

17. The Equipment Storage and Retrieval System of claim 14 wherein said frame is configured to accept a cart that has a flat bottom portion and attached vertical walls to support and retain cargo.

18. An Equipment Storage and Retrieval System for a vehicle, said vehicle having a bed, said Equipment Storage and Retrieval System comprising:

a guide rail mounted to said vehicle bed and on one side of said vehicle bed, said guide rail aligned longitudinally from front to back of said vehicle bed;

a pair of attachment posts adapted to secure said guide rail to said vehicle bed;

a frame rotatably and slidingly attached to said guide rail, said frame rotatable to a first horizontal position resting on said vehicle bed, said frame further rotatable to a second vertical position where said frame is off of said bed, with said frame adapted to receive sporting equipment hold-down fixtures, with said frame further comprising a plurality of rollers configured to contact said vehicle bed and to support a side of said frame not attached to said guide rail, with said frame further comprising longitudinal and transverse frame members approximately orthogonal to each other;

a plurality of rail rollers and rail brackets attached to said frame and configured to interfit with said guide rail, to provide sliding movement of said frame along said guide rail, with said rail rollers and rail brackets attached to the forward half of said frame;

a braking system attached to said frame, said braking system adapted to frictionally grasp said guide rail, impeding motion of said frame along said guide rail, with said braking system comprising a braking handle and braking lever with said braking lever configured to release frictional locking to said guide rail when said lever is activated; and a latch adapted to hold said frame in said second position.

* * * * *